United States Patent [19]

Maruta

[11] Patent Number: 4,914,523
[45] Date of Patent: Apr. 3, 1990

[54] OPTICAL DISK APPARATUS COMPATIBLE WITH DIFFERENT TELEVISION SYSTEM STANDARDS

[75] Inventor: Keiji Maruta, Kanagawa, Japan
[73] Assignee: Sony Corp., Tokyo, Japan
[21] Appl. No.: 221,048
[22] Filed: Jul. 19, 1988

[30] Foreign Application Priority Data

Jul. 28, 1987 [JP] Japan ................................ 188582

[51] Int. Cl.⁴ .............................................. G11B 7/00
[52] U.S. Cl. ..................................... 358/310; 358/11;
358/335; 358/342; 358/341
[58] Field of Search .................... 358/11, 12, 324, 322,
358/314, 342, 335, 310, 341, 343, 330; 360/37.1;
369/54–58

[56] References Cited

U.S. PATENT DOCUMENTS

| | | | |
|---|---|---|---|
| 4,204,220 | 5/1980 | Rutishauser | 358/11 X |
| 4,282,545 | 8/1981 | Bragas | 358/314 |
| 4,433,347 | 2/1984 | Sugiyama et al. | 358/342 |
| 4,445,143 | 4/1984 | Machida et al. | 358/322 |
| 4,490,810 | 12/1984 | Hon | 364/900 |
| 4,535,366 | 8/1985 | Pullen | 358/342 |

FOREIGN PATENT DOCUMENTS

| | | |
|---|---|---|
| 0024858 | 3/1981 | European Pat. Off. |
| 0223423 | 5/1987 | European Pat. Off. |
| 2541062 | 8/1984 | France |
| 2002990 | 2/1979 | United Kingdom |
| 2136654 | 1/1985 | United Kingdom |

Primary Examiner—Robert L. Richardson
Attorney, Agent, or Firm—Alvin Sinderbrand; Curtis, Morris & Safford

[57] ABSTRACT

An optical disk having radially discrete main and lead-in track areas in which there are respectively recorded color video information according to one of a plurality of TV systems, such as, NTSC and PAL systems, and code data including data identifying that one TV system, is reproduced by an optical disk player including a head for initially scanning and picking up the code data recorded in the lead-in track area and then scanning and picking up the color video information recorded in the main track area. The output of the head is supplied to a reproducing circuit having at least one operating mode corresponding to a predetermined one of the TV systems for processing the color video information from the output of the head when the TV system used for recording is consistent with the predetermined one of the TV systems corresponding to the operating mode, the identifying data is decoded from the output of the head when the latter scans the lead-in track area, and a function of the optical disk player is controlled in response to an inconsistency between the predetermined TV system corresponding to the operating mode of the optical disk player and the TV system used for recording as determined from the derived identifying data. The function thus controlled may be the operation of an indicator or a disk ejector, the generation of a display or message on a monitor, or the change-over of the operating mode of the disk player.

16 Claims, 3 Drawing Sheets

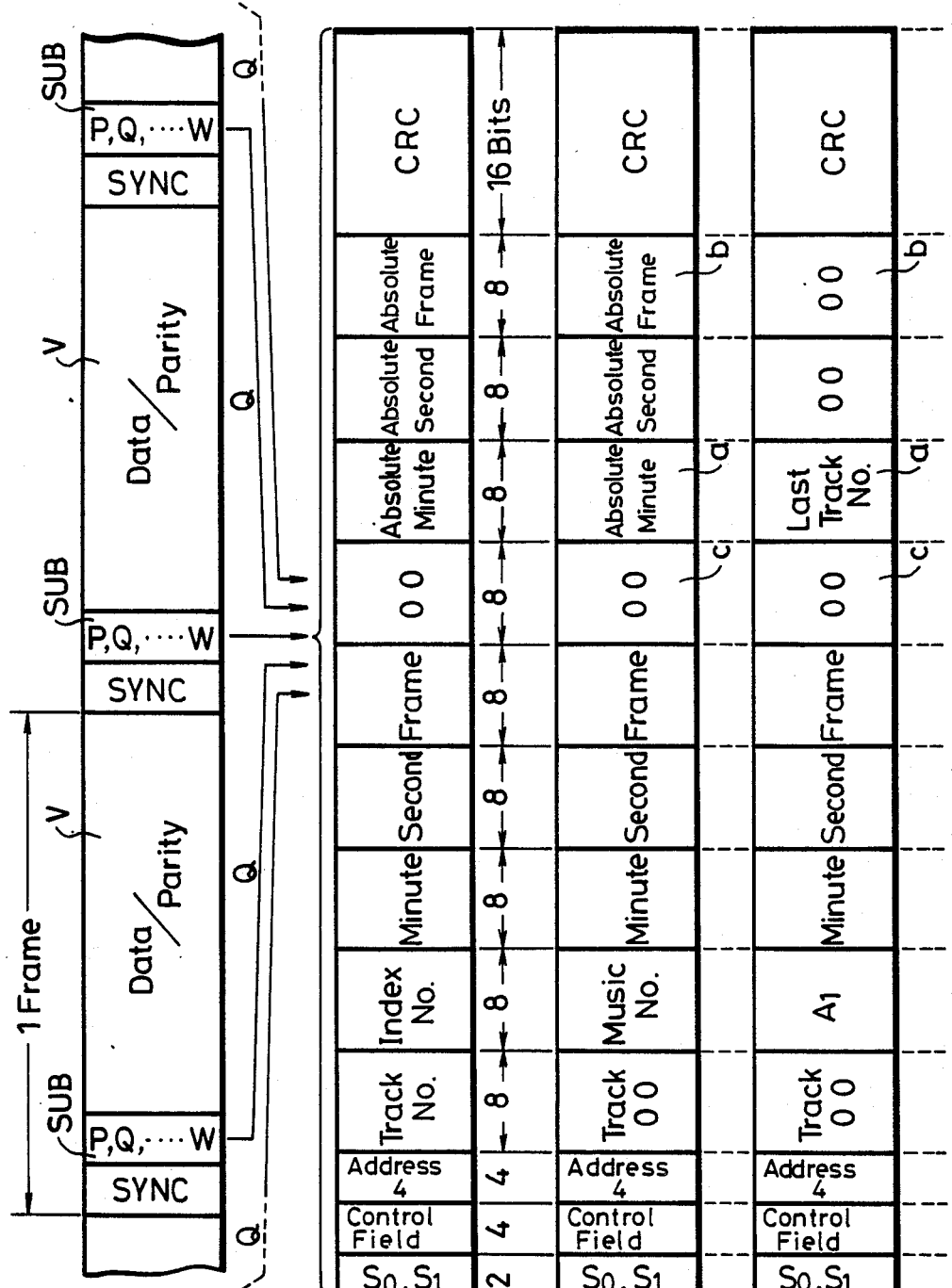
FIG. 3A  FIG. 3B  FIG. 3B1  FIG. 3B2

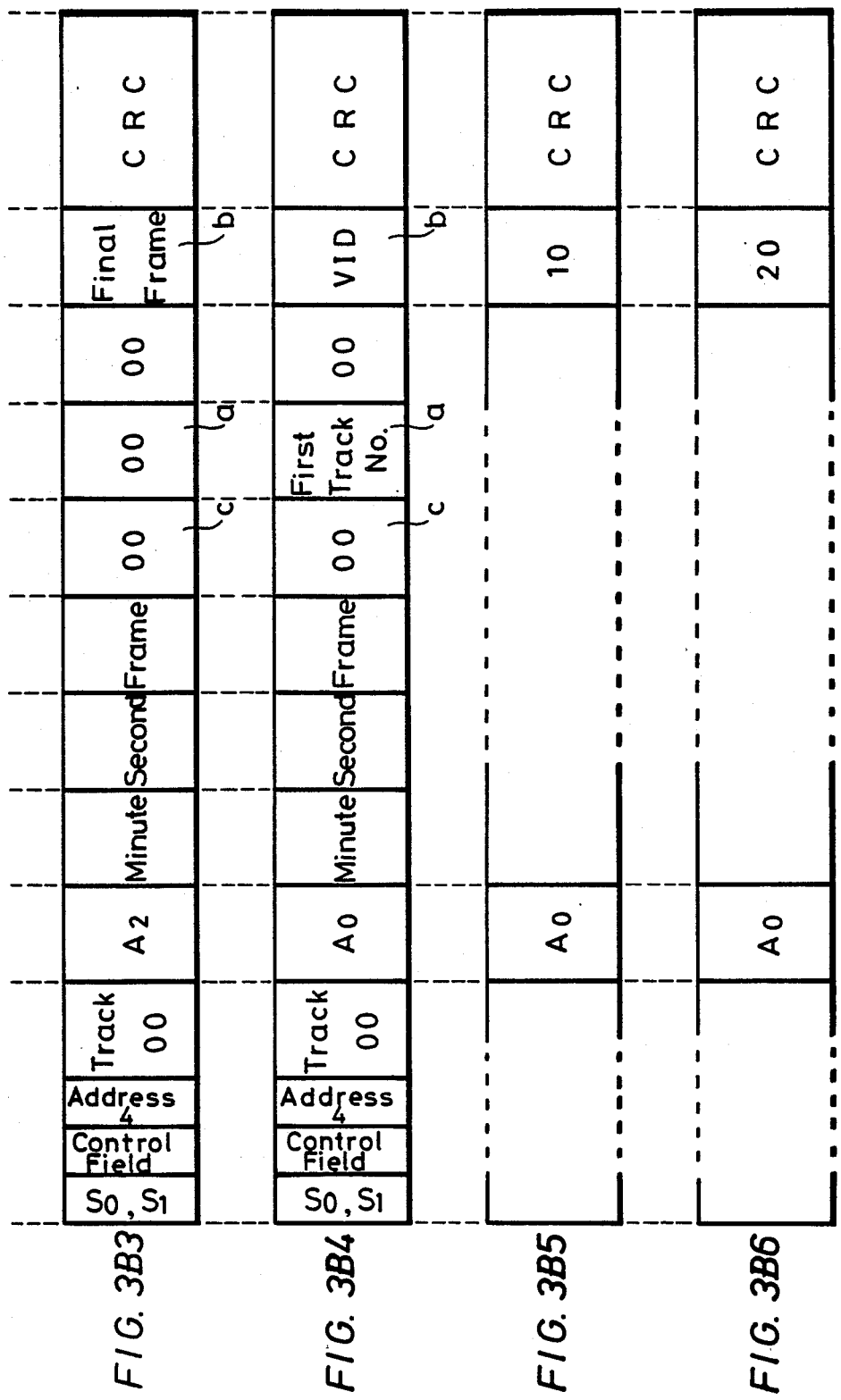

OPTICAL DISK APPARATUS COMPATIBLE WITH DIFFERENT TELEVISION SYSTEM STANDARDS

BACKGROUND OF THE INVENTION

1. Field of the Invention

This invention relates generally to optical disk reproducing apparatus, and more particularly is directed to optical disk reproducing apparatus or players for so-called compact disks having both audio and video signals recorded thereon and which are generally referred to as CDVs.

2. Description of the Prior Art

Various TV color systems, such as, the NTSC and PAL systems, are employed as recording formats for video disks, and these recording formats are similar to the correspondingly designated standard TV broadcasting systems. These standard TV broadcasting systems differ somewhat from each other. For example, an NTSC video signal has a frame frequency of 30 Hz and 525 horizontal scanning lines in each frame, while a PAL video signal has a frame frequency of 25 Hz and 625 horizontal scanning lines in each frame.

When a video disk recorded with a video signal according to the PAL system is employed in a video disk player or reproducing apparatus designed for use with an NTSC video disk, that is, a video disk recorded with a video signal according to the NTSC system, the fact that the difference between the frame frequencies of the PAL and NTSC video signals does not exceed 20% of the frame frequency of the NTSC signal makes it possible to achieve locking of the disk rotation servo with the result that an unsatisfactory video signal is obtained at the output of the video disk player. When such unsatisfactory reproduced video signal is supplied to a monitor, the latter displays a slightly disturbed black-and-white picture which is devoid of color even though a color video signal is recorded on the disk being reproduced. The display of such a defective picture on the monitor is frequently misunderstood by the user who believes it is the result of a defect or misoperation of the video disk player, rather than merely the result of seeking to playback or reproduce a video disk recorded with color video information according to one TV system by means of a video disk player intended for use with video disks recorded with color video information according to another TV system. By reason of the foregoing, the manufacturers or other sources of optical video disk players are frequently the object of unnecessary complaints or so-called nuisance calls from unjustifiably irate users of such apparatus.

In order to avoid the foregoing problem, it has been proposed to provide an optical video disk player with a device for identifying whether an optical video disk being reproduced has been recorded with color video signals according to the PAL or NTSC system by detecting and counting synchronizing signals contained in the reproduced video signal. Thus, for example, the number of horizontal synchronizing signals between successive vertical synchronizing signals, which number is different for the PAL and NTSC systems, may be counted for identifying whether the optical video disk being reproduced has been recorded according to the PAL or the NTSC system. However, a rather complicated circuit arrangement, including a counter circuit, is required for identifying the TV system used for recording the optical video disk in the described manner. Further, when the TV system used in recording the optical video disk is inconsistent with the TV system for which the optical video disk player is intended, the signal reproduced by the player is unstable with the result that the synchronizing signals included therein cannot be reliably detected. Therefore, there is some risk that the PAL, NTSC or other system with which the optical video disk has been recorded will not be reliably identified.

Recently, a so-called CDV has been developed as an outgrowth of the now widely used compact disks or CDs. A CDV is an optical disk of the same size as a CD, but with only audio signals being recorded in a radially inner track area of the disk, while video signals are recorded in a radially outer track area of the disk. In the CDV, the video signals recorded in the radially outer track area can be in accordance with the PAL, NTSC or other color TV system, while the recording format for the audio signals recorded in the radially inner track area is the same as that used for CDs, and thus is according to a world-wide standard which is independent of the TV broadcasting systems varying from country to country. Thus, when a CDV is reproduced on a CDV player, the audio or music programs recorded on the CDV in accordance with the standard format can be consistently reproduced correctly even though the video signals recorded in the radially outer track area of the CDV are in accordance with a TV system that is different from the TV system for which the CDV player is intended. As a result of the foregoing, an operator of a CDV player who has successfully reproduced the audio or music programs on a CDV is likely to believe that the CDV player is defective or at fault when an attempt to reproduce the video programs on the same CDV leads to a disturbed black-and-white picture devoid of color. Therefore, misinterpretation of the cause of the defective or unsatisfactory video playback by the CDV player occurs frequently, and the problem of unjustified complaints or nuisance calls to the manufacturer or other source of the player has become increasingly serious.

OBJECTS AND SUMMARY OF THE INVENTION

Accordingly, it is an object of the present invention to provide an optical disk reproducing apparatus or player that is capable of reliably avoiding the above described problem.

More specifically, it is an object of the present invention to provide an optical disk player for use with optical disks having color video information recorded thereon, and which avoids erroneous operation of the player with an optical disk having its recorded color video information according to a TV system other than that for which the player is intended.

It is another object of this invention to provide an optical disk player, as aforesaid, which is particularly suited for use with CDVs, that is, optical compact disks having radially inner and outer track areas in which audio programs and video programs, respectively, are recorded.

In accordance with an aspect of this invention, an optical disk having radially discrete main and lead-in track areas in which there are respectively recorded color video information according to one of a plurality of TV systems, and code data including data identifying that one TV system, is used in combination with an optical disk player including head means for initially scanning and picking up the code data recorded in the lead-in track area and then scanning and picking up the color video information recorded in the main track area, reproducing circuit means receiving the output of the head means and having at least one operating mode corresponding to a predetermined one of the TV systems for processing the color video information from the output of the head means when the TV system used for recording the optical disk is consistent with the TV system corresponding to the operating mode of the disk player, decoding means for deriving the identifying data from the output of the head means when the latter scans the lead-in track area, and control means for controlling a function of the optical disk player in response to an inconsistency between the TV system corresponding to the operating mode of the disk player and the TV system used for recording the optical disk as determined from the derived identifying data.

In one embodiment of this invention, the controlled function of the optical disk player is the operation of an indicator which, in response to an inconsistency between the TV system corresponding to the operating mode of the optical disk player and the TV system used for recording the color video information on the optical disk, functions to apprise the user of the optical disk player that the optical disk in use is not suited for the optical disk player or at least for the then established operating mode of the disk player.

In another embodiment of this invention, a monitor or other display means receives the processed color video information from the optical disk player for normally providing a corresponding visual display and, in response to an inconsistency between the TV system corresponding to the operating mode of the optical disk player and the TV system used for recording the color video information on the optical disk, an additional signal is supplied to the monitor so that the latter displays a message alerting the user to such inconsistency.

In still another embodiment of the invention, the controlled function of the optical disk player is the operation of a disk ejecting device which, in response to an inconsistency between the TV system corresponding to the operating mode of the optical disk player and the TV system used for recording the color video information on the optical disk, functions to remove the optical disk from the optical disk player.

In yet another embodiment of this invention, the optical disk player has a plurality of operating modes corresponding to respective TV systems, for example, the NTSC system and the PAL system, and, in response to an inconsistency between TV system corresponding to the then established operating mode and the TV system used for recording the color video information on the optical disk then in use, change-over is effected to another of the operating modes so as to effect removal of such inconsistency and thereby ensure trouble-free playback of the optical disk.

The above, and other objects, features and advantages of the present invention, will be apparent in the following detailed description of the preferred embodiments which is to be read in conjunction with accompanying drawings, and throughout which corresponding elements and parts are identified by the same reference numerals.

BRIEF DESCRIPTION OF THE DRAWINGS

FIG. 3A is a diagrammatic representation of the data format in a video signal lead-in track area of a CDV to which the present invention is advantageously applied;

FIG. 3B is a diagrammatic representation of the data format of one of the subcoding channels provided for each frame in FIG. 3A; and FIGS. 3B1–3B6 are diagrammatic representations corresponding to that of FIG. 3B, but illustrating how data identifying the TV system used in recording color video information on the optical disk or CDV are included in the format of the subcoding channel shown on FIG. 3B.

DETAILED DESCRIPTION OF THE PREFERRED EMBODIMENTS

Figure 1:
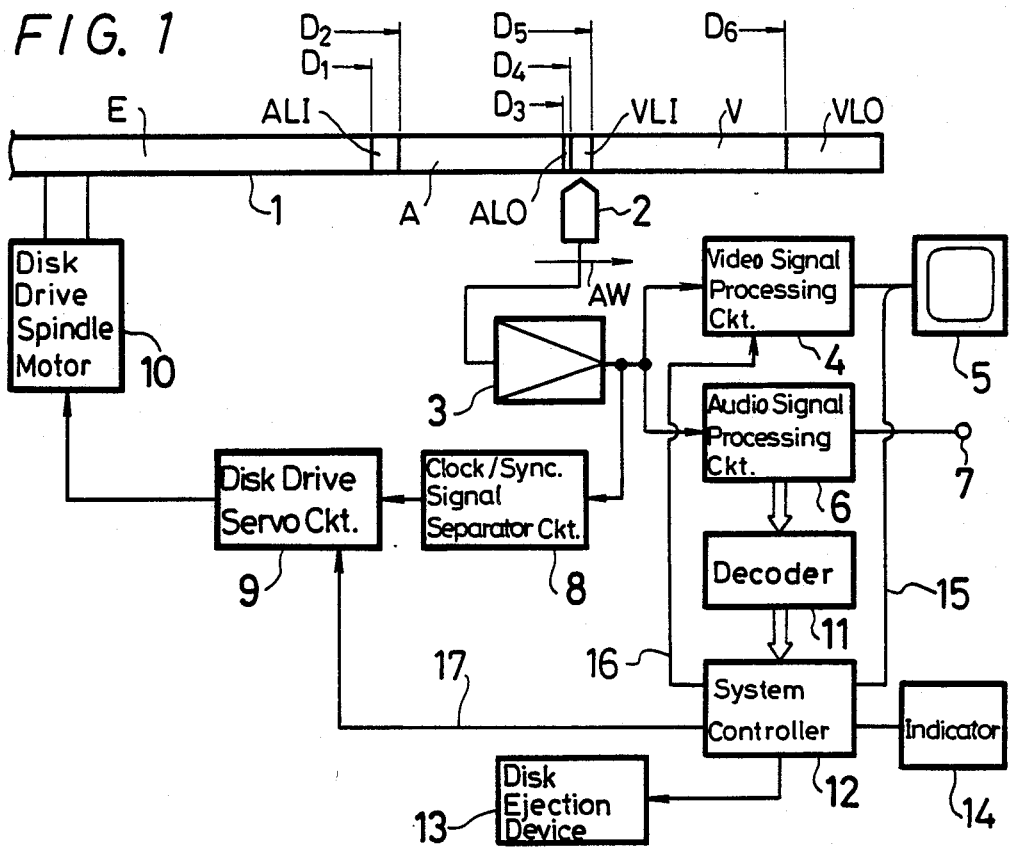
FIG. 1 is a block diagram showing an optical disk player having a control system according to an embodiment of the present invention in association with a portion of an optical disk appearing in cross section.

Referring initially to FIG. 1, it will be seen that an optical disk 1 of the kind referred to as a CDV, and which is shown in cross section, is pre-recorded in radially discrete track areas A and V with audio programs and video programs, respectively. More specifically, the CDV 1 typically has an outer diameter of 12 cm, and is provided with a central non-recorded area E having a diameter $D_1$ of 4.6 cm. Arranged successively in the radially outward direction from the non-recorded central area E are an audio signal lead-in area ALI having $D_1$ as its inner diameter and an outer diameter $D_2$ of 5.0 cm, the audio signal data area A having $D_2$ as its inner diameter and an outer diameter $D_3$ of 7.4 cm, an audio signal lead-out area ALO having $D_3$ as its inner diameter and an outer diameter $D_4$ of 7.5 cm, a video signal lead-in area VLI having $D_4$ as its inner diameter and an outer diameter $D_5$ of 7.8 cm, the video signal data area V having $D_5$ as its inner diameter and an outer diameter $D_6$ of 11.6 cm, and a video data lead-out area VLO having $D_6$ as its inner diameter and extending to the outer periphery of the CDV 1.

The audio signal recorded in the area A is a digital audio signal occupying a relatively low frequency band and having the format adopted as a world-wide standard for compact disks (CDs). The audio signal lead-in area ALI contains recorded data, such as, data identifying the time codes and frame numbers corresponding to the several musical or other audio programs recorded in the audio area A. Such data recorded in the audio signal lead-in area ALI are read out from the latter prior to the playback or reproducing of audio signals recorded in the area A for use in suitably controlling the operation of an optical disk player in playback of the audio signals recorded in the area A.

The video signal recorded in the area V according to any one of the presently employed color TV systems, such as, the PAL, NTSC or SECAM system, is a carrier frequency modulated with luminance and color signals. Also recorded with the color video signal in the area V is a digital audio signal in a frequency band below that of the frequency modulated video signal, that is, a digital audio signal similar, in format, to that recorded on CDs and hence to the digital audio signal recorded in the area A. The audio signals recorded with the video signals in the area V may be spoken words, vocalizing and/or music related to the pictures or action represented by the respective video signals, while the audio signals recorded in the area A may be, for example, music programs, unrelated to the video programs recorded on the same CDV.

As further shown diagrammatically on FIG. 1, an optical disk player for use with CDV 1 comprises an optical pick up device or head 2 suitably positioned in opposing relation to the read-out surface of the rotatably mounted CDV 1, and being movable in the radial direction of the disk or CDV 1 while the latter is rotated with a turntable or spindle by a disk spindle drive motor 10. During reproducing or playback operations of the optical disk player, the head 2 is moved in the radially outward direction, as indicated by the arrow AW, for scanning spiral tracks on the rotated CDV 1 so as to pick up or reproduce the signals recorded in such tracks.

The signals reproduced by the optical pick up or head 2 are supplied through an RF amplifier 3 to a video signal processing circuit 4 and also to an audio signal processing circuit 6. Processed color video information from the video processing circuit 4 is supplied to a monitor or other display device 5 for normally providing a corresponding visual display when the head 2 is scanning tracks in the area V and thereby reproducing color video signals or information recorded therein. In the audio processing circuit 6, the signals supplied thereto from the RF amplifier 3 are error-corrected and error-concealed or compensated and the audio signal is then converted from a digital to an analog signal which is supplied to an audio output terminal 7 to which, for example, a loud speaker or audio transducer may be connected.

The signal from the RF amplifier 3 is further supplied to a clock/synchronizing signal separator circuit 8 wherein a clock/synchronizing signal is separated from the reproduced signal and is supplied to a disk drive servo circuit 9. The servo circuit 9 provides a suitable servo control signal to the disk drive spindle motor 10 by which the rotational speed of the optical disk 1 is determined and maintanined.

Generally, in accordance with the present invention, an identifying signal is provided in the video signal lead-in area VLI of the optical disk 1 and is coded, as hereinafter described in detail, to identify the TV color system, for example, the PAL, NTSC or SECAM system, with which the video signals have been recorded in the following area V. The video signal lead-in area VLI is recorded with a standard format independent of the color TV system used for recording the video signal, for example, the standardized audio CD recording format and, therefore, the output of the head 2 when scanning the video signal lead-in area VLI is processed by the audio signal processing circuit 6 which derives the identifying signal therefrom and supplies the same through a decoder 11 to a system controller 12 by which necessary control functions are performed, as hereinafter described in detail. It will be appreciated that, since the identifying signal is recorded in the video signal lead-in area VLI which employs a standardized recording format independent of the TV system used for recording the video signals in the area V, the identifying signal in the video signal lead-in area VLI will always be reliably reproduced and decoded even though the TV system to which the recorded video signal corresponds may not be the same as that for which the optical disk player is intended.

Furthermore, the identifying signal is reproduced during scanning of the area VLI in advance of the area V in which the video signals are recorded. Thus, prior to the reproducing of the video signals which may have been recorded with a TV system inconsistent with that for which the optical disk player is intended, the decoder 11 can extract the data identifying the TV system used in recording the optical disk from the sub-code of the demodulated, error-corrected and concealed output of the audio processing circuit 6. More particularly, the decoder 11 utilizes 8-bit data, as hereinafter described, to identify the recording color TV system of the disk, and thereby permit suitable control functions or operations to be performed prior to the actual commencement of playback or reproduction of the recorded video signals.

Figure 2:
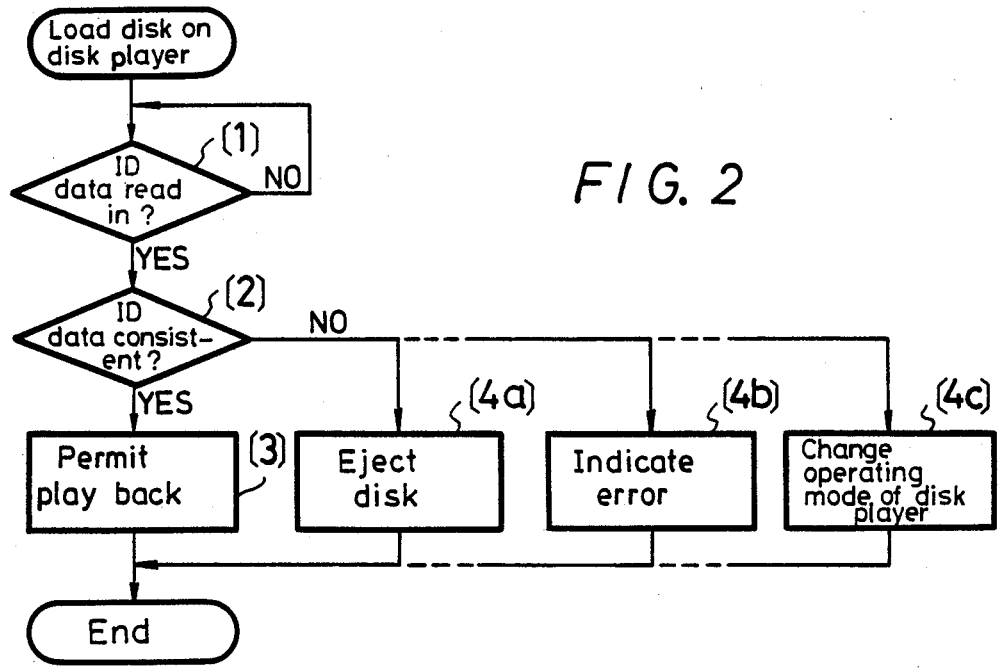
FIG. 2 is a flow chart to which reference will be made in explaining the operation of the optical disk player control system shown on FIG. 1.

As shown in the flow chart of FIG. 2, upon the loading of the optical disk 1 into the optical disk player according to this invention, the system controller 12 executes the following control operations:

After the optical disk has been loaded into the player, the head 2 is made to traverse the disk 1 in the radially outward direction indicated by the arrow AW on FIG. 1 and step [1] of FIG. 2 is repeatedly executed until it is determined that the identifying signal recorded in the video controller 12. When the signal identifying the color TV system used in recording the color video signal or information in the area V on the optical disk has been read into the memory of the system controller 12, the program proceeds to the step [2] in which it is determined whether or not the color TV system corresponding to the identifying signal read into the memory of the system controller is consistent with the TV system for which the optical disk player is intended to be used.

If the TV systems are the same or consistent with each other, as represented by a YES at the decisional step [2], the routine or program proceeds to step [3] in which a flag is set to permit the playback operation of the optical disk player to proceed unimpeded and the control operation represented by the flow chart of FIG. 2 are ended.

On the other hand, if the TV system represented by the identifying signal reproduced from the video signal lead-in area VLI of the optical disk 1 is inconsistent with an internal identifying signal provided in the system controller 12 for identifying the TV system for which the optical disk player is intended, that fact is represented by a NO as the answer to the decisional step [2], and the routine proceeds, for example, to step [4a] in which a disk ejection control signal is supplied from system controller 12 to a disk ejection device 13 by which the optical disk 1 is ejected from the player. Further, if the identifying signal reproduced from the video signal lead-in area VLI is inconsistent with the identifying signal or data representing the TV system for which the optical disk player is intended, the routine may proceed also to step [4b] in which a signal is generated by the system controller 12 for operating a visual or audible alarm or indicator 14 by which the user of the optical disk player is apprised that the optical disk in use is not suited for the disk player, or at least not suited for its present operating mode.

Alternatively, when the identifying signal reproduced from the video signal lead-in area VLI of the optical disk 1 for identifying the color TV system with which the color video signal or information has been recorded on the optical disk is inconsistent with the indicating signal or data identifying the color TV system for which the optical disk player is intended, the system controller 12 may respond to such inconsistency by supplying to the monitor or display means 5, a signal causing the monitor 5 to display a message alerting the user of the optical disk player to such inconsistency. Thus, for example, the displayed message may read "This Player is to be Used for NTSC Disks Only. Don't Play PAL Disk." The displayed message may be superposed on the video display or take the place of the latter.

Following the operation of the disk ejector 13 or indicator 14, or the displaying of a message by the monitor 5, the control operations are ended.

In the above description of embodiments of this invention, it has been assumed that the CDV or other optical disk player embodying this invention has an operating mode suitable for use only in connection with optical disks having video signals recorded in accordance with only one predetermined color TV system. However, the present invention may be embodied in a CDV player selectively capable of different modes of operation for use with CDVs having their video signals recorded in accordance with different color TV systems, for example, the NTSC and PAL systems. In that case, if the then established mode of the optical disk player is not consistent with the color TV system represented by the identifying signal read-in at step [2], the system controller 12 of the optical disk player capable of selective operation as a PAL disk player or as an NTSC disk player provides suitable control signals for changing the operating mode of the disk player, as at step [4c] on FIG. 2. Such control signals are supplied through a line 16 to the video signal processing circuit 4, and through a line 17 to the servo circuit 9, so as to effect a change-over operation by which a video signal processing circuit and a rotary disk speed characteristic of a respective operating mode are selected that are proper for the color TV system with which the CDV or other optical disk has been recorded.

It will be appreciated that, in the optical disk player control system described above, by detecting the identifying signal recorded on the CDV for indicating the color TV system for which the video signals are recorded, it is possible to execute the necessary control operations with substantial ease so as to ensure that, in the event of an inconsistency between the color TV system with which the CDV is recorded and the color TV system for which the player is intended, the cause of a defective or disturbed reproduced picture will be immediately made apparent or corrected.

The above-mentioned color TV system identifying signal is desirably provided at the sub-code area of the video signal lead-in area VLI of the optical disk 1 recorded according to the CDV format. In accordance with such format, the sub-codes are symbols formed of 8 bits which are recorded for each frame (or block), as shown in FIG. 3A. The sub-codes, apart from containing data for identifying the color TV system used for the video signals recorded in the area V, contain data for performing program functions, for example, for locating the starting points of various video programs and the associated digital audio recorded in the area V, or for reproducing or playing back such video programs and associated digital audio in a predetermined order. In this case, sub-coding channels P, Q, R, S, T, U, V and W are provided and assume 8-bit data. Bits of the sub-coding channels P and Q are utilized to perform the above-mentioned program functions, that is, to locate the starting points of desired programs or to achieve the playback of the programs in a desired order.

Referring now to FIG. 3B, it will be seen that a coding data series is there formed by re-arranging data in the channel Q of sub-code data SUB recorded at every frame of digital audio data accompanying a video signal recorded in the video data area V (FIG.3A). A suitable coding method for the sub-code and the audio data is disclosed in detail in U.S. Pat. No. 4,541,093, issued. Sept. 10, 1985, and having a common assignee with the present application. In the coding data series shown on FIG. 3B, a track number, an index number, a running time of a music program in minutes, seconds and frames, an absolute or total running time of the music programs again given in absolute minutes, seconds and frames, and the like are sub-coded according to the predetermined sub-coding method. It will be seen in FIG. 3B that the signal format employed is similar to that referred to as "address (mode) 4" used on optical video disks and on CDVs.

FIGS. 3B1 to 3B4 illustrate respective data formats of coded data recorded in the video signal lead-in area VLI and which correspond to the above described data format shown in FIG. 3B. In such case, "00" represents the number of the track in the "Track No." area, and a Table of Contents, referred to as a "TOC", is recorded in the "Index No." area and in the area for the "absolute running time". More specifically, the "Index No." area is used as a pointer in which is provided a music or video program number for each music and/or picture program recorded on the CDV (FIG. 3Bl). Other frames are provided which have pointers A1, A2 and A0, for example, as shown on FIGS. 3B2, 3B3 and 3B4, respectively. By way of example, the music number of the first recorded music program associated with a video program is provided in the area a of the absolute running time of the frame having the frame pointer A0 (FIG. 3B4). The music number of the last music program associated with a recorded video program is similarly provided in the area a of the absolute running time of the frame having the pointer A1 (FIG. 3B2). The absolute running time up to the end of the last music program associated with a recorded video program is provided in the absolute running time area of the frame having the pointer A2 (FIG. 3B3). Further, an identifying signal (VID) is provided in the area b, that is, the frame designation, of the absolute running time of the frame having the pointer A0 (FIG. 3B4). More specifically, in the 2 digits BCD notation of 8 bits, "10" indicates the data format of the stero audio signal recorded on a CDV having its video recorded with the NTSC color TV system (FIG. 3B5); "11" indicates the data format of the bilingual audio signal recorded on a CDV having its video signals recorded with the NTSC color TV system; "12" indicates the data format of the stero audio signal recorded on a video disk havings its video signals recorded with the NTSC color TV system; "13" indicates the data format of the bilingual audio signal recorded on a video disk having its video signals recorded with the NTSC color TV system; "20" indicates the data format of the stereo audio signal recorded on a CDV having its video signals recorded with the PAL color TV system (FIG. 3B6); "21" indicates the data format of the bilingual audio signal recorded on a CDV havings its video signals recorded with the PAL color TV system; "22" indicates the data format of the stereo audio signal recorded on a video disk having its video signals recorded with the PAL color TV system; and "23" to indicates the data format of the bilingual audio signal recorded on a video disk having its video signals recorded with the PAL color TV system.

Thus, merely by determining whether the second digit of the 2 digits BCD notation in the area b on FIG. 3B4 refers to "1", as in FIG. 3B5, or "2" as in FIG. 3B6, it is possible to identify whether the loaded optical disk has video signals recorded thereon in accordance with the NTSC color TV system or the PAL color TV system, respectively. In a similar manner, an optical disk having video signals recorded in accordance with the SECAM system may be readily identified in accordance with the present invention.

Alternatively, in accordance with the present invention, the undefined area c in each of FIGS. 3B$_1$–3B$_4$ between the indication of the running time of the respective music program and the indication of the absolute running time may be used to contain the data or identifying signal indicating the color TV system used for recording the respective video signal or program. Moreover, if desired, the TV color system identifying signal may be provided by utilizing, in the "Index No." area a numeral larger than A3, that is, a numeral which has not yet been defined in the "Index No." area. It is also possible to provide the identifying signal for indicating the color TV system used in recording the video signals by similarly using any available ones of the sub-code channels R-W other than the channels P and Q.

Although the present invention is particularly advantageous when applied to a CDV player, it can be applied to any other optical video disk reproducing apparatus or player for reproducing optical video disks having video signals recorded in a main track area of the disk and the identifying signal recorded in a lead-in track area which is scanned in advance of the latter for reproducing the identifying signal and thereby indicating the color TV system used for recording the video signals. In such case, since the format used for recording the lead-in track area is independent of the color TV system employed in recording the video signals, the identifying signal in the lead-in track area is reliably detected and reproduced when scanning the lead-in track area even if the optical disk on the player has had its video signals recorded with a color TV system that is different from the color TV system for which the player is intended.

Although several preferred embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. The combination of an optical disk having radially discrete main and lead-in track areas in which there are respectively recorded color video information according to one of a plurality of TV systems, and code data including data identifying said one of the TV systems; and an optical disk player including head means for initially scanning and picking up said code data recorded in said lead-in track area and then scanning and picking up said color video information recorded in said main track area, reproducing circuit means connected with an output of said head means and having at least one operating mode corresponding to a predetermined one of said TV systems for processing said color video information from said output of the head means when said one TV system used for recording is consistent with said predetermined one of the TV systems corresponding to said operating mode, decoding means for deriving said identifying data from said output of the head means when the latter scans said lead-in track area, and control means for controlling a function of said optical disk player in response to an inconsistency between said predetermined TV system corresponding to the operating mode and said one TV system used for recording as determined from the derived identifying data.

2. The combination according to claim 1; in which said optical disk player further includes indicating means connected with said control means, and said function controlled in response to said inconsistency is operation of said indicating means for apprising a user of the optical disk player that the optical disk in use is not suited for said operating mode of the disk player.

3. The combination according to claims 1; further comprising display means receiving the processed color video information from said reproducing circuit means for normally providing a corresponding visual display; and in which said control means responds to said inconsistency by supplying to said display means a signal causing said display means to display a message alerting the user to said inconsistency, the displaying of said message being said controlled function.

4. The combination according to claim 1; further comprising disk ejecting means for removing an optical disk from said optical disk player; and in which said control means responds to said inconsistency by operating said disk ejecting means so that the removal from the optical disk player of an optical disk recorded with a TV system that is inconsistent with said predetermined TV system corresponding the operating mode of the disk player is said controlled function.

5. The combination according to claim 1; in which said reproducing circuit means has another operating mode corresponding to another of said TV systems, and said reproducing circuit means is changeable between said one operating mode and said other operating mode for processing said color video information from said output of the head means when said optical disk has been recorded with the TV system to which the operating mode of the reproducing circuit means corresponds; and in which said control means responds to said inconsistency by changing-over said reproducing circuit means between said operating modes so as to effect removal of said inconsistency as said controlled function.

6. The combination according to claim 1; in which said plurality of TV systems include the NTSC, PAL and SECAM systems.

7. The combination according to claim 1; in which said color video information is recorded as a frequency modulated signal in said main track area, said main track area further has a digital audio signal recorded therein in a frequency band below that of said frequency modulated signal and with a format that does not vary with said TV systems, and said lead-in track area is recorded with said format which includes sub-coding channels at least one of which contains said data identifying the TV system used for recording the color video information; said reproducing circuit means includes video processing means for demodulating said frequency modulated signal and thereby deriving said color video information therefrom, and audio processing means for deriving said audio signal from said output of the head means when scanning said main track area and for deriving said code data in the sub-coding channels from said output of the head means when scanning said lead-in track area; and said decoding means provides said data identifying the TV system used for recording said color video information from said code data derived by said audio processing means.

8. The combination according to claim 7; in which said optical disk is a CDV having an audio track area in which only digital audio signals are recorded with the same format as said lead-in track area, and said lead-in track area is radially disposed between said audio track area and said main track area; and in which said head means normally scans said optical disk in the radial direction from said audio track area to said main track area.

9. An optical disk player for use with an optical disk having radially discrete main and lead-in track areas in which there are respectively recorded color video information according to one of a plurality of TV systems, and code data including data identifying said one TV system used in recording the color video information, said optical disk player comprising:

head means for initially scanning and picking up said code data recorded in said lead-in track area and then scanning and picking up said color video information recorded in said main track area;

reproducing circuit means connected with an output of said head means and having at least one operating mode corresponding to a predetermined one of said TV systems for processing said color video information from said output of the head means when said one TV system used for recording is consistent with said predetermined one of the TV systems corresponding to said operating mode;

decoding means for deriving said identifying data from said output of the head means when the latter scans said lead-in track area; and control means for controlling a function of said optical disk player in response to an inconsistency between said predetermined TV system corresponding to the operating mode and said one TV system used for recording the optical disk in use as determined from the derived identifying data.

10. An optical disk player according to claim 9; further comprising indicating means connected with said control means; and in which said function controlled in response to said inconsistency is operation of said indicating means for apprising a user of the optical disk player that the optical disk in use is not suited for said operating mode of the disk player.

11. An optical disk player according to claim 9; further comprising display means receiving the processed color video information from said reproducing circuit means for normally providing a corresponding visual display; and in which said control means responds to said inconsistency by supplying to said display means a signal causing said display means to display a message alerting the user to said inconsistency, the displaying of said message being said controlled function.

12. An optical disk player according to claim 9; further comprising disk ejecting means for removing an optical disk from said optical disk player; and in which said control means responds to said inconsistency by operating said disk ejecting means so that the removal from the optical disk player of an optical disk recorded with a TV system that is inconsistent with said predetermined TV system corresponding to the operating mode of the disk player is said controlled function.

13. An optical disk player according to claim 9; in which said reproducing circuit means has another operating mode corresponding to another of said TV systems, and said reproducing circuit means is changeable between said one operating mode and said other operating mode for processing said color video information from said output of the head means when said optical disk has been recorded with the TV system to which the operating mode of the reproducing circuit means corresponds; and in which said control means responds to said inconsistency by changing over said reproducing circuit means between said operating modes so as to remove said inconsistency as said controlled function.

14. An optical disk player according to claim 9; in which said plurality of TV systems include the NTSC, PAL and SECAM systems.

15. An optical disk player according to claim 9; in which said color video information is recorded as a frequency modulated signal in said main track area, said main track area further has a digital audio signal recorded therein in a frequency band below that of said frequency modulated signal and with a format that does not vary with said TV systems, and said lead-in track area is recorded with said format which includes sub-coding channels at least one of which contains said data identifying the TV system used for recording the color video information; said reproducing circuit means includes video processing means for demodulating said frequency modulated signal and thereby deriving said color video information therefrom, and audio processing means for deriving said audio signal from said output of the head means when scanning said main track area and for deriving said code data in the sub-coding channels from said output of the head means when scanning said lead-in track area; and said decoding means provides said data identifying the TV system used for recording said color video information from said code data derived by said audio processing means.

16. An optical disk player according to claim 9; in which said optical disk is a CDV having an audio track area in which only digital audio signals are recorded with the same format as said lead-in track area, and said lead-in track area is radially disposed between said audio track area and said main track area; and in which said head means normally scans said optical disk in the radial direction from said audio track area to said main track area.

* * * * *